No. 875,564. PATENTED DEC. 31, 1907.
J. R. AYERS.
FERTILIZER DISTRIBUTER.
APPLICATION FILED JUNE 10, 1907.
4 SHEETS—SHEET 1.
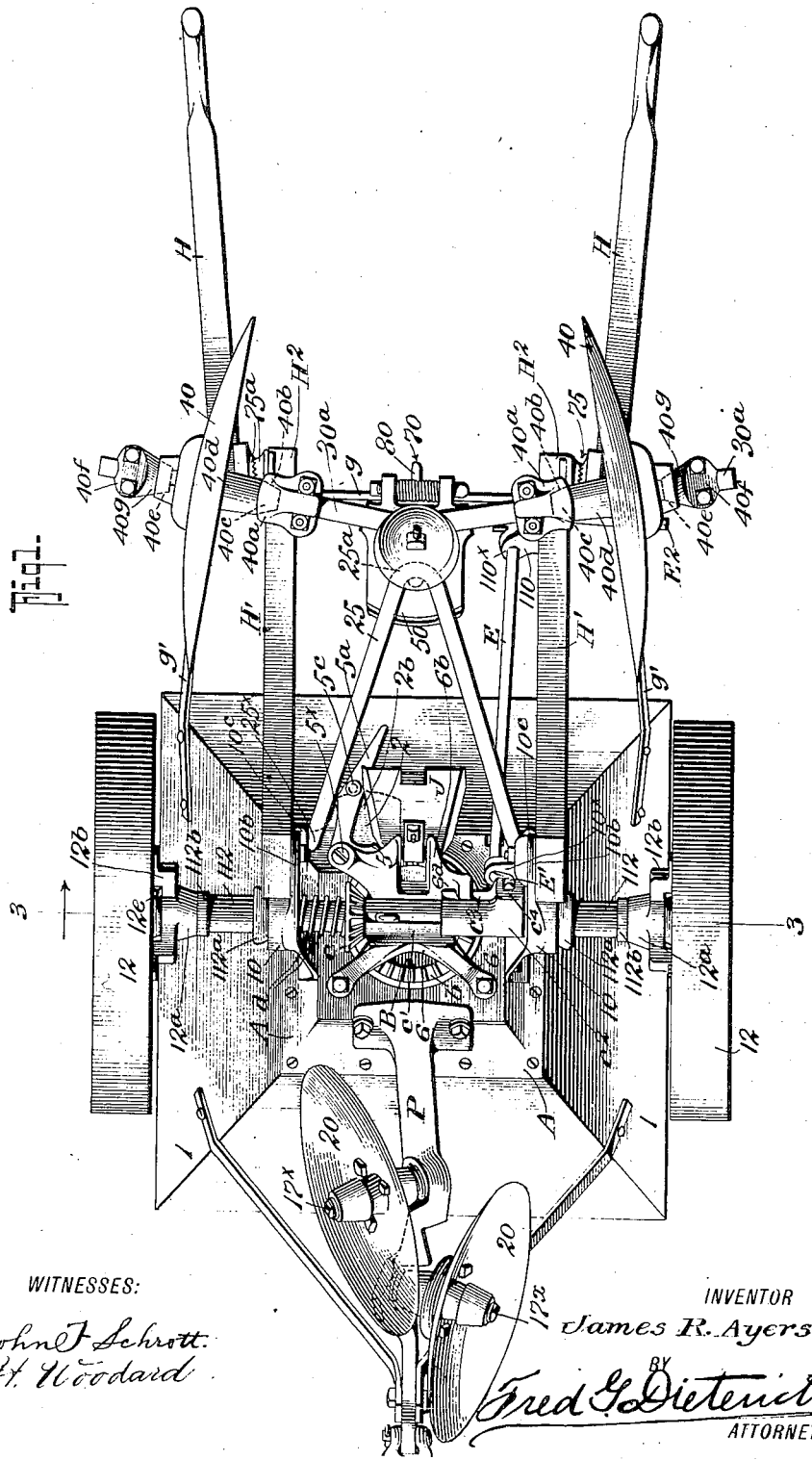
WITNESSES:
John F. Schrott.
H. Woodard
INVENTOR
James R. Ayers
BY
Fred G. Dieterich & Co
ATTORNEYS

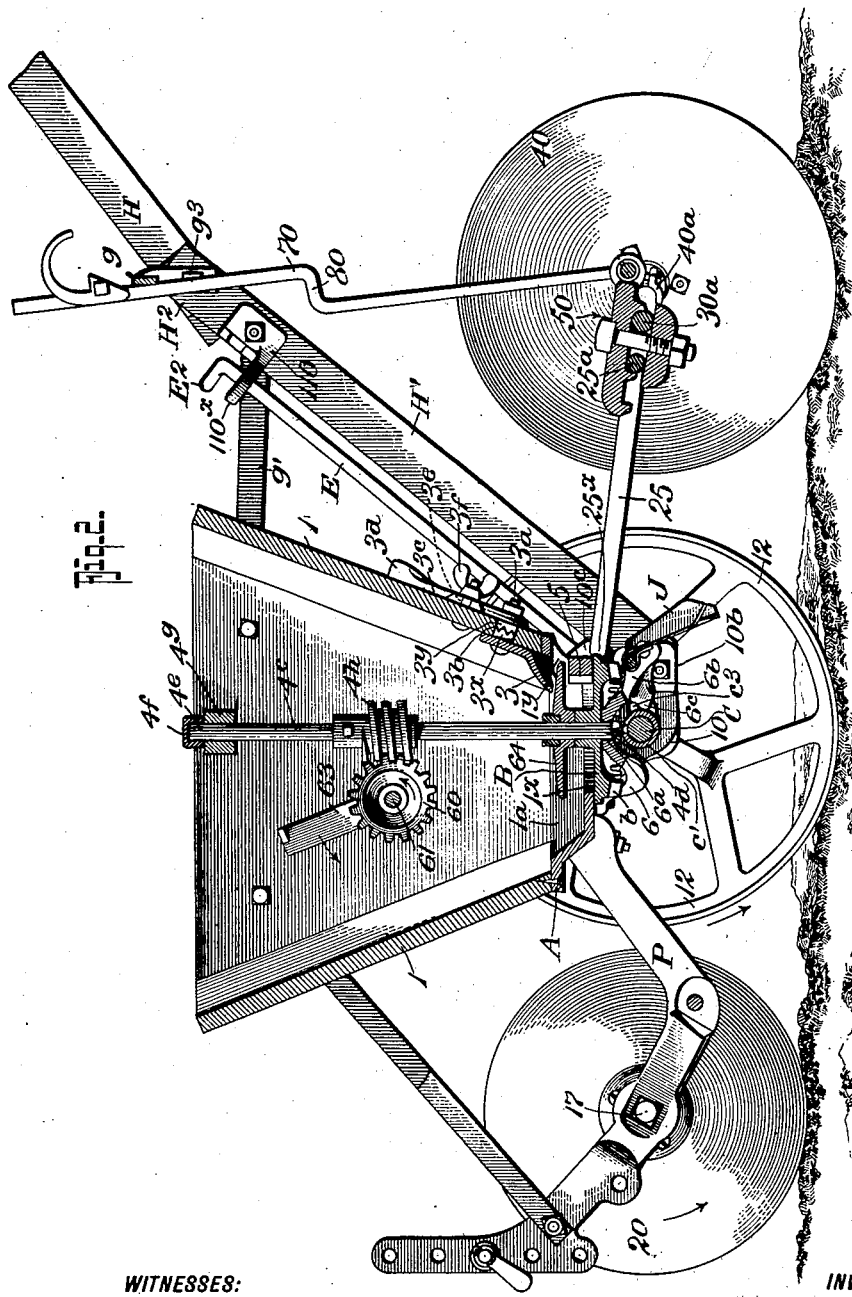

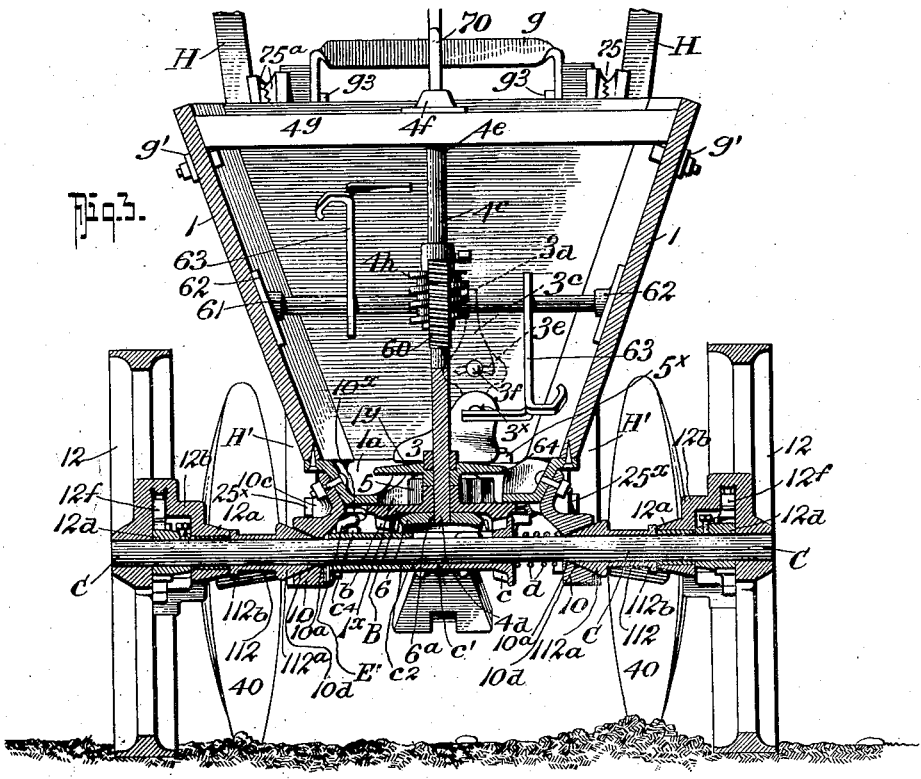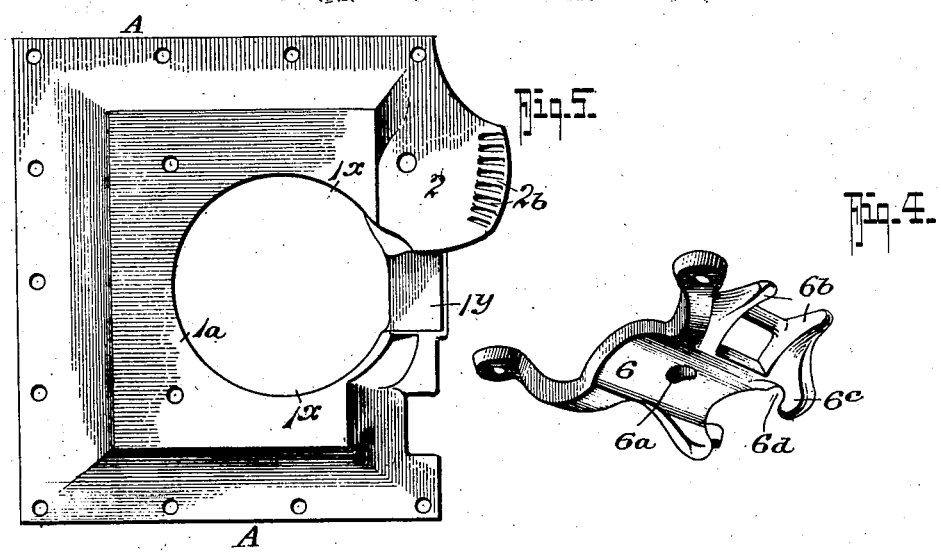

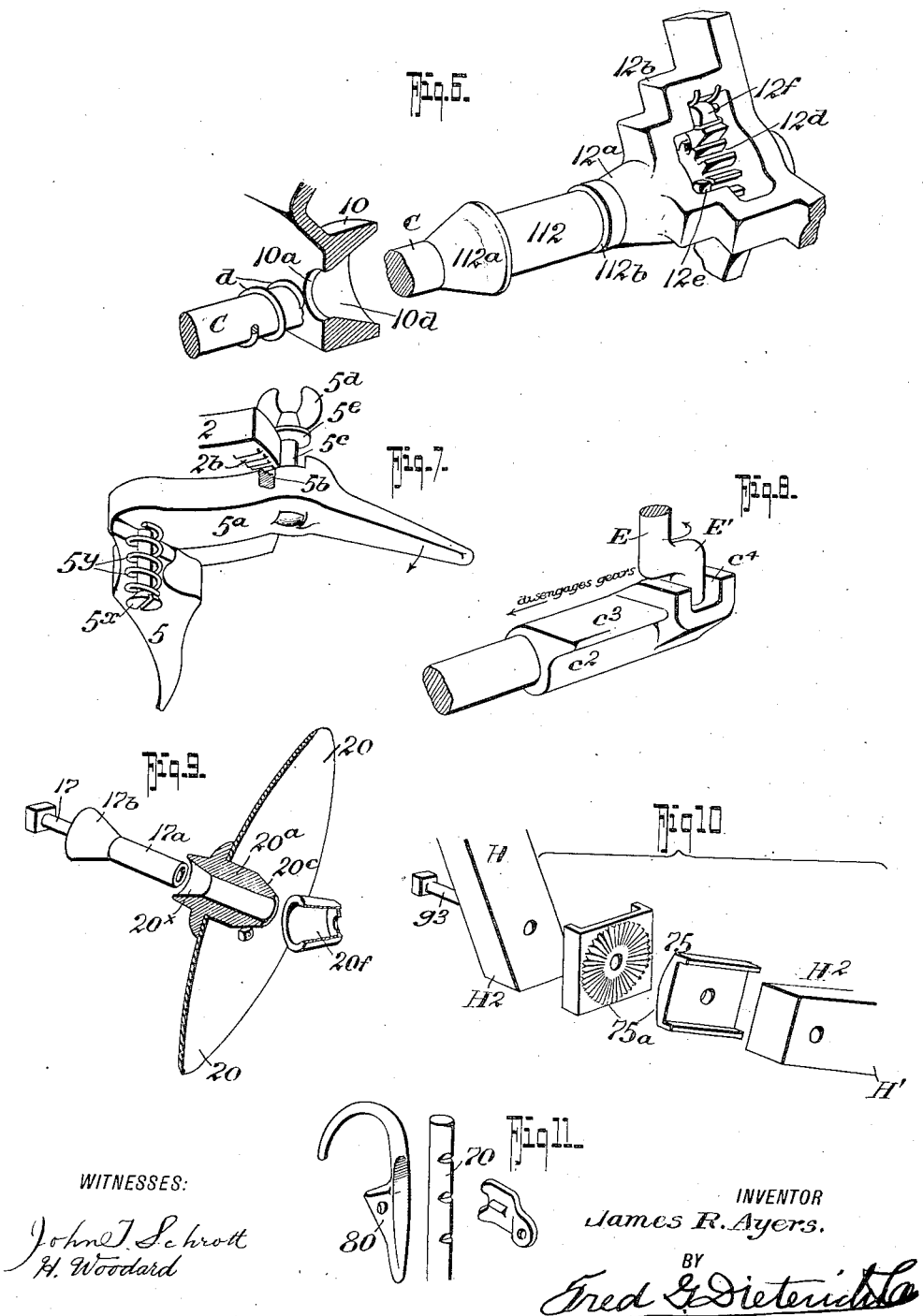

UNITED STATES PATENT OFFICE.

JAMES R. AYERS, OF PETERSBURG, VIRGINIA.

FERTILIZER-DISTRIBUTER.

No. 875,564.     Specification of Letters Patent.     Patented Dec. 31, 1907.

Application filed June 10, 1907. Serial No. 378,180.

*To all whom it may concern:*

Be it known that I, JAMES R. AYERS, residing at Petersburg, in the county of Dinwiddie and State of Virginia, have invented certain new and useful Improvements in Fertilizer-Distributers, of which the following is a specification.

My invention primarily has for its object to provide an improved construction of fertilizer distributer whereby the parts can be easily and cheaply manufactured and in which the parts are coöperatively combined to admit of their being readily assembled to produce a stable and durable mechanism which will readily and effectively serve for its intended purposes.

In its generic nature, my invention comprises an improved distributer of the type disclosed in my Patent No. 711,274, granted October 14, 1902, and the invention also has for its object to provide an improved form of agitating mechanism, an improved adjustable shelf or gate within the hopper over the outflow port thereof, an improved shifting lever mechanism for throwing the machine into and out of gear, together with certain other novel features of construction all of which will be first described in detail and then be specifically pointed out in the appended claims, reference being had to the accompanying drawings, in which:

Figure 1, is an inverted plan view of my invention. Fig. 2, is a central, vertical longitudinal section thereof. Fig. 3, is a horizontal section on the line 3—3 of Fig. 1. Fig. 4, is a perspective view of the spider or bracket. Fig. 5, is an inverted plan view of the main casting or bottom. Fig. 6, is a detail perspective view of a portion of the main shaft and one drive wheel, parts being broken and separated. Fig. 7, is a detail perspective view of the guano outlet regulator. Fig. 8, is a detail perspective view of the gear shifter. Fig. 9, is a detail perspective view showing the method of mounting the front plowing or furrow opening disks. Fig. 10, is a detail view of one of the adjustable handle connections. Fig. 11, is a detail view of the rear plow raising handle.

Referring now to the accompanying drawings, in which like letters and numerals of reference indicate like parts in all of the figures, 1 designates the hopper which may be of the conventional shape, the bottom of the hopper having a trough portion $1^a$, formed in the main casting A, as shown.

2 designates a deflector guide bracket which projects from one side of the casting A. In lieu of projecting the bracket 2 over the discharge throat of the hopper, as is done in my patent hereinbefore referred to, I provide an adjustable shelf 3 which has a hub portion $3^x$ having a serrated face to coöperate with the serrated face of the hub portion $3^y$ of the lever $3^c$, the hub portions $3^x$ and $3^y$ being held in the bearing apertures $3^b$ of the hopper 1, and the handle $3^d$ and the shelf 3 being secured together by the bolt $3^a$ and nut which coöperates therewith, as clearly shown in Fig. 2 of the drawings. The lever $3^c$ permits the hubs $3^x$ and $3^y$ being rotated and in turn the shelf 3 tilted at different angles to the bottom of the hopper 1 for purposes of adjustment. The lever $3^c$ has a hand engaging portion $3^d$ and an elongated slotted portion $3^e$ which coöperates with a bolt and wing nut $3^f$ to hold the lever $3^c$ in its adjusted positions.

In order to regulate the feed of the discharge, I provide a gate 5 which is mounted in the discharge throat $1^y$ of the casting A, the construction of which is best shown in Figs. 3 and 7 of the drawings, by reference to which it will be seen that the gate 5 is fulcrumed on a bolt $5^x$ and is held pressed against the bracket 2 by a coil spring $5^y$ which is also carried on the bolt $5^x$ and beneath the gate 5. The gate 5 includes an arm $5^a$ which projects beyond the bracket 2 and has rack surfaces $5^b$ to coöperate with the rack surfaces $2^b$ of the bracket 2. The gate 5 is held in its adjusted positions with the respective rack surfaces engaging one another by means of a bolt $5^c$, nut $5^d$ and washer $5^e$ as will be clearly understood by reference to Figs. 1, 3 and 7 of the drawings.

The casting A which includes the trough $1^a$ hereinbefore referred to, has a central aperture $1^x$, as shown, and beneath this aperture $1^x$ and to form a closure therefor, is a plate B which is provided with a gear surface $b$, and which is held to rotate in a horizontal plane and is fixedly connected with the worm shaft $4^c$ of the stirring mechanism. The lower end $4^d$ of the shaft $4^c$ is journaled in the central bearing socket $6^a$ of a spider 6 which is securely bolted to the casting A and which spider 6 also has a rearwardly projecting bracket member $6^b$ to which the deflector J is connected in a manner similar to that disclosed in my patent hereinbefore referred to. The spider bracket 6 is also provided with a finger $6^c$ that merges with the socket-like portion $6^d$ for a purpose presently explained.

Bolted or otherwise secured to the main drive shaft carrying brackets 10 which have apertures $10^a$ for the passage of the main drive shaft C, and also have conical bearing portions $10^d$ to coöperate with the bearing cones $112^a$ on the main drive shaft. The brackets 10 are also provided with extension members $10^b$ to which the relatively fixed portions H′ of the handles H are fixedly secured by bolts or otherwise. The brackets 10 also have apertured bearing portions $10^c$ to receive the angled ends $25^x$ of the yoke shaped bar 25. As shown, the bar 25 may be of the same construction as that shown in my patent hereinbefore referred to and it includes the central hub portion $25^a$ for engaging the coupling member 50, see Figs. 1 and 2 of the drawings.

The coupling member 50 together with the manner of securing the bar 25 thereto, and the manner in which the axles $30^a$ are secured to the coupling member may be the same as that disclosed in my patent hereinbefore referred to, and as may also be the construction of lifting bar 70 and its detent 80 as well as its connection with the coupling member 50, and a further detailed description thereof is thought to be unnecessary.

The manner in which the rear cutting or covering disks 40 are mounted on their respective axles $30^a$, forms an essential part of my present invention. A split clamp member $40^a$ having a conical bearing portion $40^b$ to receive the similarly formed end $40^c$ of the hub $40^d$ of the disk 40 is secured to the axle $30^a$ at each side of the center thereof. The hub $40^d$ is also provided with a conical bearing $40^e$ to coöperate with a second split clamp member $40^f$ which has a conical bearing surface $40^g$ to coöperate with the bearing $40^e$ of the hub $40^a$ as clearly shown in Fig. 1 of the drawings.

The main drive shaft C passes through the bearing portions $10^d$ and $10^a$ of the brackets 10, the conical bearing recesses $10^d$ of the brackets 10 coöperating with the conical bearing surfaces $112^a$ of the bearing sleeve 112 which is held loosely on the axle C and has an annular collar portion $112^b$ at its opposite end to engage with the hub portion $12^a$ of the spider frame $12^b$ that forms a part of the drive wheel 12. Between the hub $12^a$ of the spider frame $12^b$ and the main hub portion of the wheel, a ratchet gear $12^d$ is mounted on the shaft C and locked to rotate therewith by a set screw $12^e$. $12^f$ designates a pawl carried by the wheel for engaging the ratchet gear $12^d$ to lock the same, and cause it to rotate with the drive wheel 12 when the drive wheel 12 turns in the proper direction.

Mounted on the shaft C between the brackets 10 is a pinion $c$ which is adapted to mesh with the master gear $b$ of the member B. The pinion $c$ has a sleeve $c'$ splined to the shaft C to be endwise shiftable thereon and the pinion $c$ is normally held in engagement with the gear $b$, by a coil spring $d$ on the shaft C in a manner similar to that shown in my patent hereinbefore referred to.

$c^2$ designates a sleeve mounted on the shaft C to be endwise shiftable thereon, and the sleeve $c^2$ has a flange $c^3$ to coöperate with the finger $6^c$ and groove of the spider 6 which prevents the sleeve $c^2$ from turning with the shaft and at the same time permits its longitudinal shifting. The sleeve $c^2$ has a groove portion $c^4$ to coöperatively receive the crank end E′ of a shifting lever E which passes through a bearing $10^x$ on one of the brackets 10 and also through the supplemental bearing $110^x$ of the supplemental bracket 110 that is secured to one of the fixed handle portions H′ of the handles H of the machine. The shifting rod E has a hand engaging lever portion $E^2$ for rotating the rod E to shift the sleeve $c^2$ and in turn shift the pinion $c$ out of engagement with the gear $b$ to render the agitator mechanism inoperative at times.

The fixed portions H′ of the handles H are connected at their outer ends by a cross bar $g$ and are furthermore connected by straps $g'$ connected with the hopper 1, the straps $g'$ and the cross bar $g$ being connected with the upper ends of the fixed handle portions H′ by bolts $g^3$ as will be clearly understood by reference to the drawings.

The bolts $g^3$ pass through adjustable connecting members 75 which connect the fixed handle portions H′ with the adjustable handle portions $H^2$ of the handles H. The connecting members 75 are shown in detail in Fig. 10 and consist of a grooved plate adapted to fit on the ends of the handle sections H′—$H^2$ and are provided on their contacting faces with rack portions $75^a$ to lock the members 75 together from rotation on the portions $g$ which pass through the connecting ends of the handle members. Thus it will be seen that by loosening the nuts of the bolts $g^3$ the handles can be adjusted to any desired angle to suit the convenience of the operator.

Secured to the main casting A and projected forwardly therefrom is the combined draft bar and cutter and furrow opener disk carrier P from which the disk shaft bolts 17 project. Upon each bolt 17 is mounted a sleeve $17^a$ having a conical bearing hub $17^b$ to coöperatively engage the conical bearing seat $20^x$ of the hub $20^a$ of the rotary disks 20, the hub $20^a$ having a seat $20^c$ to coöperate with the bell member $20^f$ which is held on the bolt 17 by the nuts $17^x$. Thus it will be seen the sleeve $17^a$ is loose on the shaft bolts 17 and the hub 20ª turns loosely on the sleeve 17ª, thus giving an ample easy running bearing for the disks 20, as will be readily understood by reference to the drawings. This improved means for mounting the front disk forms an essential part of my present invention. The agitating means which also forms an essential part of my present invention, it will be noticed consists of the worm shaft 4ᶜ whose upper end 4ᵉ is held in the bearing 4ᶠ on a cross bar or strut 4ᵍ held within the hopper 1 and the worm shaft 4ᶜ carries a worm 4ʰ which meshes with the worm gear or pinion 60 on the agitator shaft 61. The agitator shaft 61 is horizontally mounted in bearing members 62 which are secured to the side walls of the hopper 1, and the shaft 61 carries adjustably and removably secured arms 63 which are secured to the shaft to rotate therewith and serve the function of agitators.

64 designates a stirrer secured to the worm shaft 4ᶜ directly over the bottom aperture of the casting A and in alinement with the discharge opening thereof, the stirrer rotating on an axis at right angles to the axis of rotation of the arms 61 and form in conjunction with said arms the agitating and stirring mechanism which prevents the choking or clogging up of the materials within the hopper.

In the practical application of my invention, the front plowing disks 20 serve to plow up the ground and open a furrow in the usual manner, while the rear disks 40 serve as coverer disks to cover up the ground after the fertilizer has been distributed thereover. It will be also noticed that all of the essential parts of the operating mechanism are connected with the main or master casting A and it will be also noticed that by reason of the peculiar combined draft and supporting bar P, and the manner in which the trench or furrow openers are attached, a very effective means for digging the furrow is provided, and means are also provided for so supporting the disks on the draft member that the side pressure of one disk is balanced by the other. The manner of supporting the rear end of the covering mechanism admits of readily changing the position of the said mechanism from an inoperative to an operative one, which is accomplished by slipping the detent devices to a released position, and after being thus released the same can be made to hold the coverer devices at the desired adjustments by simply raising up on the handles H, until the detent 80 engages the bar g.

While I have shown my invention as especially designed as a guano or fertilizer distributer, it is obvious that with but slight changes of the dropping mechanism it may be utilized for planting purposes.

From the foregoing description taken in connection with the accompanying drawings, the complete construction, operation and numerous advantages of my invention will be readily understood by those skilled in the art to which the invention appertains.

What I claim is—

1. A machine as described, in combination with the hopper having a discharge throat at the side of its bottom, of a regulating gate held in said discharge throat, and an adjustable shelf held in said hopper over said discharge throat, substantially as shown and described.

2. In a machine as described, the combination with the hopper having a discharge throat at its side and a regulating gate held in said discharge throat, of an adjustable shelf held within the hopper and in operative relation with said discharge throat, and means on the outside of the hopper and coöperatively connected with said shelf for adjusting the same, substantially as shown and described.

3. In a machine as described, the combination with the hopper having a discharge throat at its side and a regulating gate held in said discharge throat, of an adjustable shelf held within the hopper and in operative relation with said discharge throat, means on the outside of the hopper and coöperatively connected with said shelf for adjusting the same, said last named means comprising a lever, a pivotal connection between the lever and the shelf, and means for holding the lever in its adjusted positions substantially as shown and described.

4. In a machine of the class described, the combination with the hopper having a bottom provided with a discharge throat, a gate coöperatively held in said discharge throat, a shelf connected with said hopper and coöperatively held with respect to said discharge throat, combined with the stirring mechanisms comprising a rotatable shaft, a stirrer secured thereto adjacent said discharge throat, an agitator shaft mounted in bearings in said hopper, gear connections between said rotatable shaft and said agitator shaft and agitator arms mounted on said agitator shaft, substantially as shown and described.

5. In a machine of the class described, the combination with the wheeled drive shaft, the hopper and the means for mounting the drive shaft on the hopper, said hopper having a discharge throat, of a gate adjustably held in coöperative relation with said discharge throat, an agitator and stirring mechanism held within the hopper, means for driving said agitator and stirring mechanism from the drive shaft, a shelf held within the hopper, said shelf having a hub provided with a serrated face and held in the bearing apertures in the hopper, a lever having a serrated faced hub portion likewise held in said hopper bearing portion to engage with the hub portion of the gate, a bolt for holding said hub portions in contact to form a pivot bearing for said gate and lever, and means for holding said lever in its adjusted positions, substantially as shown and described.

6. In a machine of the class described, the combination with a wheeled drive shaft, and hopper supported thereon, said hopper having a discharge throat, of an agitator and stirring mechanism held within the hopper and driven from the drive shaft, said agitator and stirring mechanism comprising a vertically disposed worm shaft, and a horizontally disposed agitator shaft geared with said worm shaft, and agitators mounted on said agitating shaft, substantially as shown and described.

JAMES R. AYERS.

Witnesses:
JOHN D. WENKINS,
IDA JONES.